US008620656B2

(12) United States Patent
Fu et al.

(10) Patent No.: US 8,620,656 B2
(45) Date of Patent: *Dec. 31, 2013

(54) CONVERTING PARTIAL WORD LISTS INTO A PHONEME TREE FOR SPEECH RECOGNITION (75) Inventors: Guo Kang Fu, Beijing (CN); Zhao Bing Han, Beijing (CN); Bin Jia, Eastleigh (GB); Ying Liu, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,614

(22) Filed: Mar. 4, 2012

(65) Prior Publication Data
US 2012/0166197 A1 Jun. 28, 2012

Related U.S. Application Data (63) Continuation of application No. 13/287,400, filed on Nov. 2, 2011.

(30) Foreign Application Priority Data

Nov. 30, 2010 (CN) .......................... 2010 1 0580334

(51) Int. Cl.
*G10L 15/06* (2013.01)
*G10L 15/04* (2013.01)

(52) U.S. Cl.
USPC .......................................... 704/242; 704/254

(58) Field of Classification Search
None
See application file for complete search history.

(56) References Cited

U.S. PATENT DOCUMENTS

| 5,384,893 | A | * | 1/1995 | Hutchins | 704/267 |
| 5,428,707 | A | * | 6/1995 | Gould et al. | 704/231 |
| 5,724,481 | A | * | 3/1998 | Garberg et al. | 704/243 |
| 5,917,891 | A | * | 6/1999 | Will | 379/88.03 |
| 5,995,930 | A | * | 11/1999 | Hab-Umbach et al. | 704/254 |
| 6,167,117 | A | * | 12/2000 | Will | 379/88.03 |
| 6,260,014 | B1 | * | 7/2001 | Bahl et al. | 704/254 |
| 6,377,925 | B1 | * | 4/2002 | Greene et al. | 704/271 |
| 6,405,168 | B1 | * | 6/2002 | Bayya et al. | 704/256 |
| 6,622,121 | B1 | * | 9/2003 | Crepy et al. | 704/243 |

(Continued)

FOREIGN PATENT DOCUMENTS

| CN | 1979637 A | 6/2007 |
| CN | 101470701 A | 7/2009 |

OTHER PUBLICATIONS

Schalkwyk, Johan, et al., "Speech Recognition with Dynamic Grammars Using Finite-State Transducers", in Proceedings of Eurospeech (2003), Geneva, pp. 1969-1972.

(Continued)

*Primary Examiner* — Talivaldis Ivars Smits
(74) *Attorney, Agent, or Firm* — Holland & Knight LLP; Mark H. Whittenberger, Esq.

(57) ABSTRACT

The present invention discloses converting a text form into a speech. In the present invention, partial word lists of a data source are obtained by parsing the data source in parallel or in series. The partial word lists are then compiled to obtain phoneme graphs corresponding, respectively, to the partial word lists, and then the obtained phoneme graphs are combined. Speech recognition is then conducted according to the combination results. According to the present invention, computational complexity may be reduced and recognition efficiency may be improved during speech recognition.

8 Claims, 5 Drawing Sheets

(56) References Cited

U.S. PATENT DOCUMENTS

| | | | |
|---|---|---|---|
| 6,823,309 B1* | 11/2004 | Kato et al. ................. 704/267 |
| 6,870,914 B1* | 3/2005 | Bossemeyer et al. .... 379/142.06 |
| 7,124,082 B2* | 10/2006 | Freedman ................. 704/260 |
| 7,324,945 B2* | 1/2008 | Butzberger et al. ........ 704/270.1 |
| 7,346,507 B1* | 3/2008 | Natarajan et al. ............ 704/244 |
| 7,577,569 B2* | 8/2009 | Roth et al. ................. 704/260 |
| 7,706,513 B2* | 4/2010 | Bossemeyer et al. .... 379/142.04 |
| 7,844,459 B2* | 11/2010 | Budde et al. ................. 704/254 |
| 7,855,817 B2* | 12/2010 | Nakatsu ................. 359/204.1 |
| 7,885,817 B2 | 2/2011 | Paek et al. |
| 8,005,674 B2 | 8/2011 | Janke et al. |
| 8,140,336 B2* | 3/2012 | Saffer ................. 704/257 |
| 2007/0124142 A1* | 5/2007 | Mukherjee ................. 704/235 |
| 2008/0126093 A1* | 5/2008 | Sivadas ................. 704/254 |
| 2008/0126094 A1 | 5/2008 | Janke et al. |
| 2010/0030561 A1* | 2/2010 | Mori et al. ................. 704/260 |
| 2010/0324894 A1* | 12/2010 | Potkonjak ................. 704/235 |

OTHER PUBLICATIONS

Guo Kang Fu et al., U.S. Appl. No. 13/287,400, filed Nov. 2, 2011, Office Action, Nov. 12, 2012, 8 pages.

Foreign Office Action in CN 201010580334.2, issued on Sep. 10, 2013, 6 pages.

* cited by examiner

CONVERTING PARTIAL WORD LISTS INTO A PHONEME TREE FOR SPEECH RECOGNITION

BACKGROUND

The present invention relates to information technology, and more particularly to converting text into speech for speech recognition.

Up to now, LVCSR (Large Vocabulary Continuous Speech Recognition) and NLU (natural language processing) still cannot meet the requirements of accuracy and performance of human-machine speech communication in real life.

When the data source content changes in a speech-enabled application, for example, in the speech control application based on web page, the grammar must be generated dynamically according to the data source content.

During speech recognition, how to reduce computational complexity and improve the recognition efficiency is a problem to be confronted.

BRIEF SUMMARY

According to a first aspect of the present invention, the present invention provides a method of converting a text into a speech, comprising: parsing a data source in a text form to obtain partial word lists of the data source; compiling the partial word lists to obtain phoneme graphs corresponding, respectively, to the partial word lists; combining the obtained phoneme graphs; and conducting speech recognition according to the combination results.

According to a second aspect of the present invention, the present invention provides a system for converting a text form into a speech, comprising: a data parser, configured to parse a data source in the text form to obtain partial word lists of the data source; one or more compilers, configured to compile the partial word lists to obtain phoneme graphs corresponding, respectively, to the partial word lists; a combiner, configured to combine the obtained phoneme graphs; and a speech recognizer, configured to conduct speech recognition according to the combination results.

According to the present invention, computational complexity may be reduced and the recognition efficiency may be improved during speech recognition.

BRIEF DESCRIPTION OF THE SEVERAL VIEWS OF THE DRAWINGS

Other objectives and effects of the present invention will become clearer and easier to understand with more comprehensive understanding of the present invention in conjunction with the explanations of the following accompanying drawings, wherein.

In all of the above figures, like reference numbers denote identical, similar, or corresponding features or functions.

DETAILED DESCRIPTION

Specific embodiments of the present invention are described herein with reference to the drawings.

The basic idea of the present invention is obtaining partial word lists of a data source in a text form by parsing the data source in parallel or in series; then compiling the partial word lists to obtain phoneme graphs corresponding, respectively, to the partial word lists; then combining the obtained phoneme graphs; and then conducting speech recognition according to the combination results.

Figure 1:
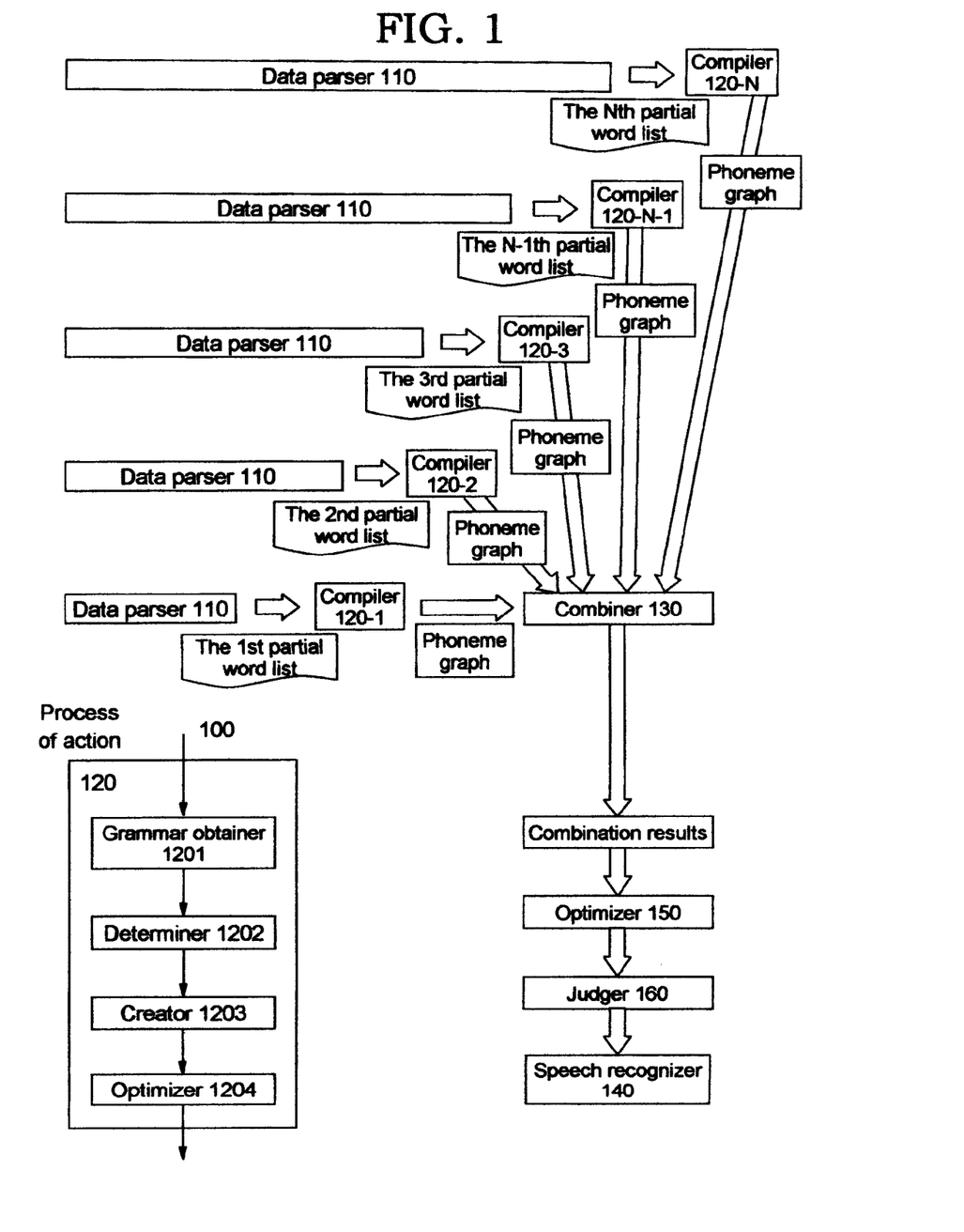
FIG. 1 illustrates a system of converting a text into a speech according to a first embodiment of the present invention.

FIG. 1 illustrates a system of converting a text into a speech according to a first embodiment of the present invention.

As shown in FIG. 1, the system 100 comprises a data parser 110 for parsing a data source in the text form to obtain partial word lists of the data source; a plurality of compilers 120-1, 120-2, 120-3, . . . 120-N-1, 120-N for compiling the partial word lists to obtain phoneme graphs corresponding, respectively, to the partial word lists; a combiner 130 for combining the obtained phoneme graphs; and a speech recognizer 140 for conducting speech recognition according to the combination results.

It should be understood by those skilled in the art that the term "word", as used herein, represents a common grammatical element such as a character, a word, and/or a phrase. A partial word list refers to part of the word list obtained by parsing the whole data source.

In the first embodiment of the present invention, the data parser 110 parses the data source in series, after obtaining a partial word list of the data source, the data parser 110 invokes a compiler (e.g., the compiler 120-1) to compile the partial word list to obtain a phoneme graph, and then the data parser 110 continues to parse the remaining data source to obtain a next partial word list.

In the first embodiment, the system 100 further comprises a judger 160 for judging whether combination results have sufficient information to conduct speech recognition. If there is sufficient information—for example, if there is a complete sentence—then the speech recognizer 140 starts the speech recognition.

In the first embodiment, each compiler 120 in the compilers 120-1, 120-2, 120-3, . . . 120-N-1, 120-N can comprise a grammar obtainer 1201 for applying a grammar template with respect to a partial word list to obtain a grammar corresponding to the partial word list; a determiner 1202 for determining a phoneme list of the grammar; a creator 1203 for creating a corresponding phoneme tree according to the phoneme list; and an optimizer 1204 for optimizing the phoneme tree to obtain a corresponding phoneme graph.

The grammar template generally comprises contents describing what the grammar should be like.

The following is an example of a grammar template:

```
<rule ID> =
Word_sequence_1 |
Word_sequence_2 |
.....
Word_sequence_N;
Word_sequence_1 = word_1 word_2 word_3 ;
Word_sequence_2 = word_1 word_3 word_2;
...
Word_sequence_N = word_1 word_4 word_2;
```

The grammar specifically describes the contents of the partial word list, for example, whether the contents of the partial word list is English or Chinese, and whether the English (if any) is American English or British English.

An example of the grammar of a partial word list is presented as below:

```
#ABNF 1.0 ISO-8859-1;
language en-US;
mode voice;
root $main;
$main = red flag |
white house | yellow flag|
xxx |xxx
```

The phoneme list describes how the word is pronounced. The phoneme list can be determined from a phoneme pool according to the grammar.

The following is an example of a phoneme list:
White: HH W AY TD
White: W AY TD
House: HH AW S
House: HH AW Z
Yellow: Y EH L OW
Yellow: Y EH L AX
Red: R EH DD
Flag: F L AE GD In one word, those skilled in the art can understand the meaning of terms such as the grammar template, the grammar, the phoneme list and phoneme tree, completely. For the sake of conciseness, they are not described in more detail herein.

During optimization of the phoneme tree, identical nodes in the phoneme tree are combined so as to obtain the phoneme graph.

Certainly, those skilled in the art can understand that in the first embodiment, if the processing speed of the compiler is fast enough—i.e., when the data parser 110 sends a partial word list to the compiler, such that compilation of another partial word list preceding said partial word list is already finished—then only one compiler is needed.

In addition, those skilled in the art can understand that the optimizer is not necessary in the compiler 120 in some cases.

Figure 2:
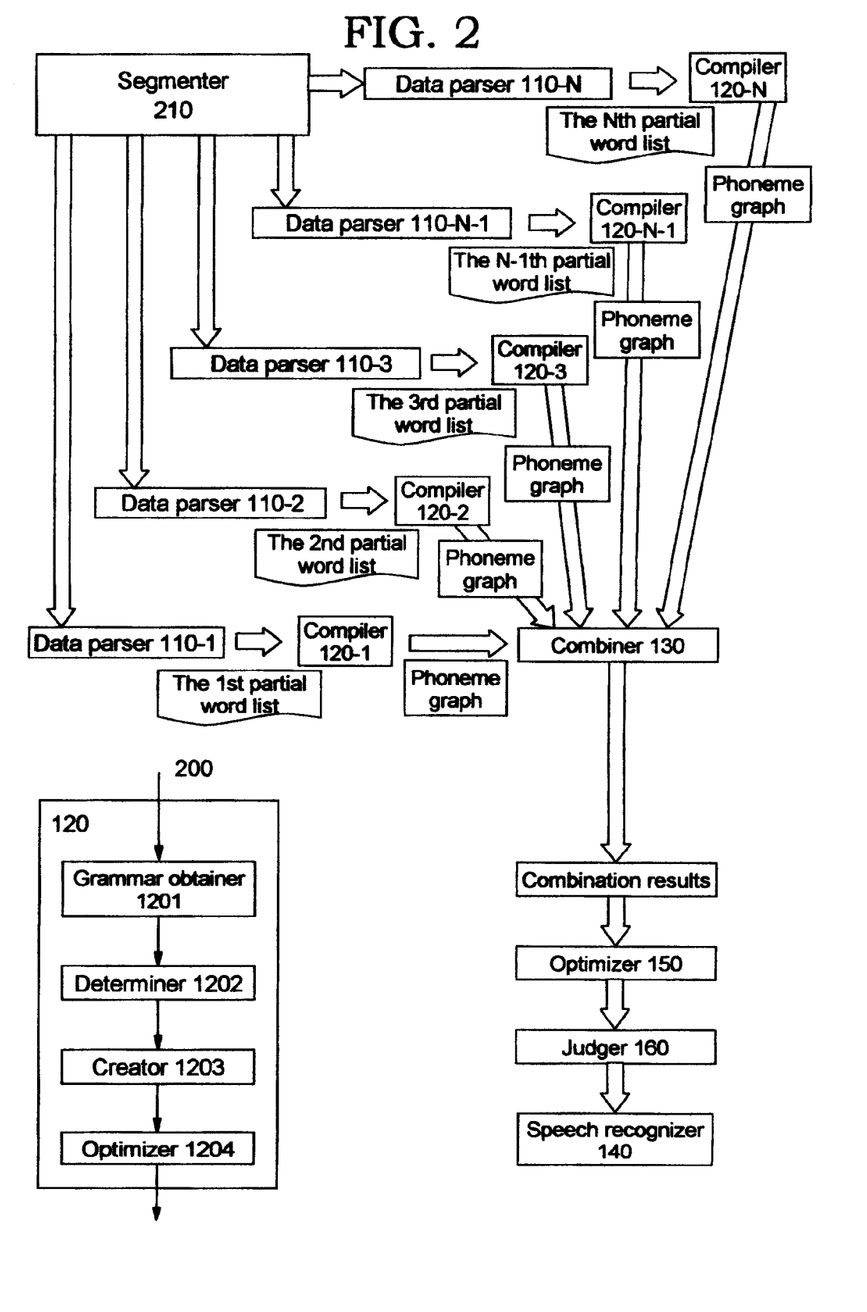
FIG. 2 illustrates a system of converting a text into a speech according to a second embodiment of the present invention.

FIG. 2 illustrates a system of converting a text into a speech according to a second embodiment of the present invention.

The system 200 differs from the system 100 shown in FIG. 1 in that the system 200 comprises a segmenter 210 for segmenting a data source to obtain segments of the data source, and a plurality of data parsers 110-1, 110-2, 110-3, . . . 110-N-1, 110-N which parse the data source segments in parallel to obtain partial word lists of the data source segments.

Figure 3:
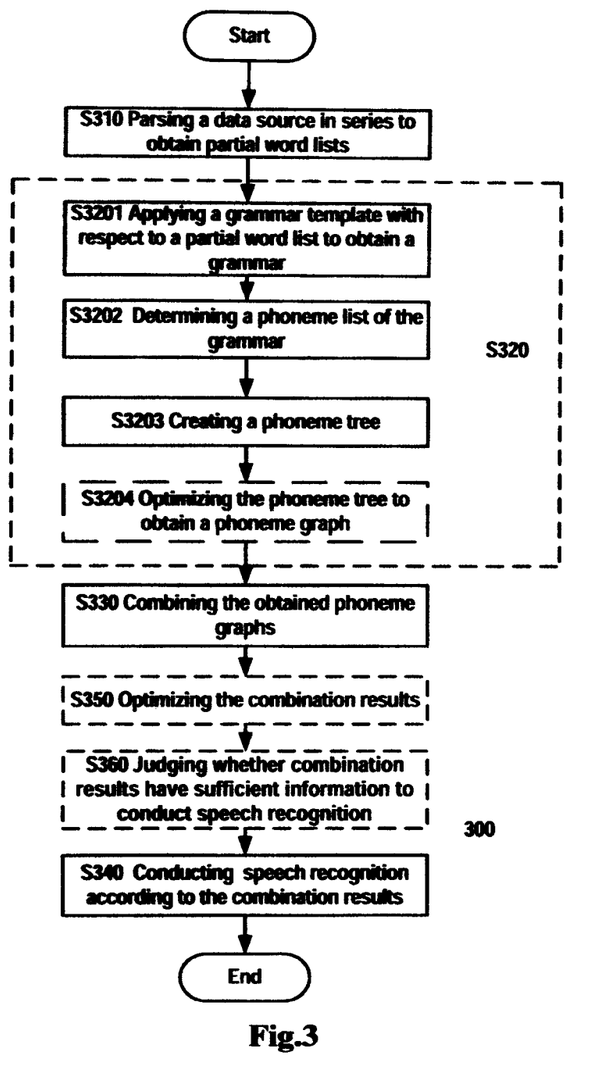
FIG. 3 illustrates a flowchart of a method of converting a text into a speech according to a third embodiment of the present invention.

FIG. 3 illustrates a flowchart of a method of converting a text into a speech according to a third embodiment of the present invention.

As shown in FIG. 3, the method 300 comprises step S310 for parsing a data source in the text form to obtain partial word lists of the data source; step S320 for compiling the partial word lists to obtain phoneme graphs corresponding, respectively, to the partial word lists; step S330 for combining the obtained phoneme graphs; and step S340 for conducting speech recognition according to the combination results.

In the third embodiment, the data source is parsed in series, and after a partial word list is obtained, the partial word list is compiled to obtain a phoneme graph. The remaining data source is then parsed continually to obtain a next partial word list.

In the third embodiment, the method further comprises step S360 for judging whether combination results have sufficient information to conduct speech recognition before combination of the phoneme graphs is finished. If there is sufficient information—for example, if there is a complete sentence—then speech recognition will be started.

In the third embodiment, before combination of the obtained phoneme graphs is finished, if the current data source changes, then combination of the obtained phoneme graphs is continued and the combination results are cached.

In the third embodiment, the method can further comprise step S350 for optimizing the combination results.

In the third embodiment, the step of compiling partial word lists to obtain phoneme graphs corresponding, respectively, to the partial word lists can comprises step S3201 of applying a grammar template with respect to a partial word list to obtain a grammar corresponding to the partial word list; step S3202 of determining a phoneme list of the grammar; step S3203 of creating a corresponding phoneme tree according to the phoneme list; and step S3204 of optimizing the phoneme tree to obtain a corresponding phoneme graph.

Certainly, those skilled in the art can understand that the step of optimizing the phoneme tree to obtain a corresponding phoneme graph is not necessary in some cases.

Figure 4:
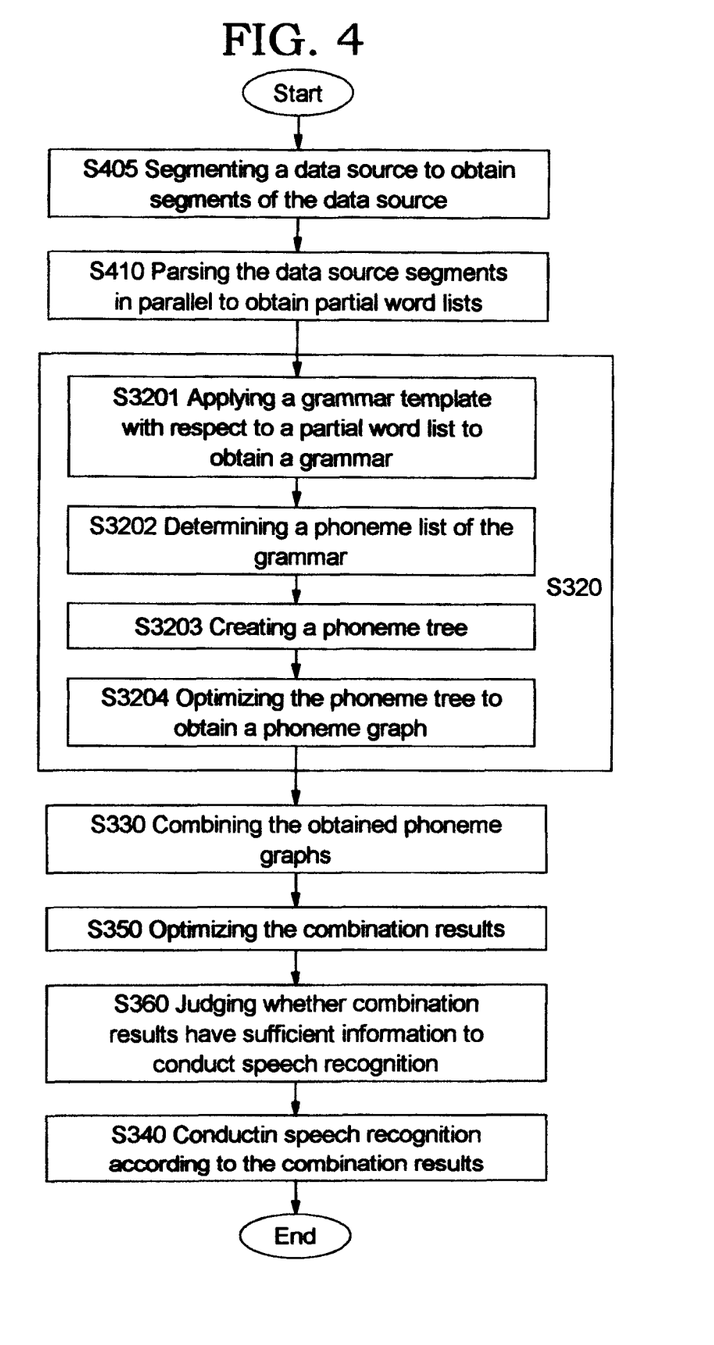
FIG. 4 illustrates a flowchart of a method of converting a text into a speech according to a fourth embodiment of the present invention.

FIG. 4 illustrates a flowchart of a method of converting a text into a speech according to a fourth embodiment of the present invention.

The method 400 differs from the method 300 shown in FIG. 3 in that the method 400 comprises a step 405 for segmenting a data source to obtain segments of the data source, and in step 410, parsing the data source segments occurs in parallel to obtain partial word lists of the data source segments.

Embodiments of the present invention will now be described in more detail with reference to an example.

In this example, the data parser 110 parses the data source in series. After obtaining a first partial word list which includes the content Red flag, the data parser 110 invokes a first compiler 120-1 to compile the first partial word list to obtain a first phoneme graph.

In this example, the grammar obtained by the first compiler 120-1 is as below:

```
#ABNF 1.0 ISO-8859-1;
language en-US;
mode voice;
root $main;
$main = Red flag
xxx |xxx
```

The determined phoneme list is as below:
Red: R EH DD
Flag: F L AE GD

Figure 5A:
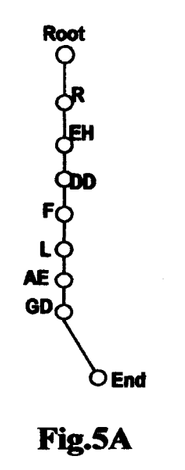
FIG. 5 illustrates specific examples of converting a text into a speech according to an embodiment of the present invention.

The created phoneme tree is as shown in FIG. 5A.

Since in this simple example, the phoneme tree shown in FIG. 5A is already optimized, so it needn't be optimized by an optimizer component.

Further, since this is a first obtained phoneme graph, no combination occurs at this time.

In addition, provided that the first phoneme graph does not have sufficient information for speech recognition, speech recognition does not happen at this time.

As the data parser 110 continues to parse the remaining data source, it obtains a second partial word list which includes the content White house, and then invokes a second compiler 120-2 to compile the second partial word list to obtain a second phoneme graph.

In this example, the grammar obtained by the second compiler 120-2 is as below:

```
#ABNF 1.0 ISO-8859-1;
language en-US;
mode voice;
root $main;
$main = White house
xxx |xxx
```

The determined phoneme list is as below:
White: HH W AY TD
White: W AY TD
House: HH AW S
House: HH AW Z The created phoneme tree is as shown in FIG. 5B.

Figure 5B:
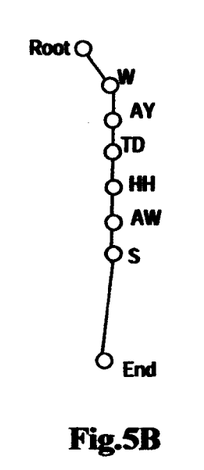

Since in this simple example, the phoneme tree shown in FIG. 5B is already optimized, it needn't be optimized by an optimizer component.

Figure 5C:
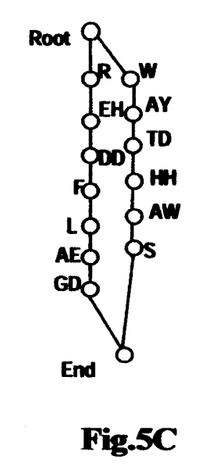

Further, since this is a second obtained phoneme graph and the first phoneme graph is obtained previously, combination occurs at this time. The combination result is as shown in FIG. 5C. Since both of the first phoneme graph and the second phoneme graph have a root node and an end node (but no other common nodes), the combination of the phoneme graphs is relatively simple, i.e., the root nodes and end nodes of the first phoneme graph and the second phoneme graph are combined.

In addition, provided that the result from combining the first phoneme graph and the second phoneme graph already has sufficient information for speech recognition, speech recognition happens at this time.

Besides, in this example, the combination result of the first phoneme graph and the second phoneme graph is already optimized at this time, so optimization will not be conducted for the combination result at this time.

As the data parser 110 continues to parse the remaining data source, it obtains a third partial word list (the last one) which includes the content Yellow flag, and then it invokes a third compiler 120-3 to compile the third partial word list to obtain a third phoneme graph.

In this example, the grammar obtained by the third compiler 120-3 is as below:

```
#ABNF 1.0 ISO-8859-1;
language en-US;
mode voice;
root $main;
$main = Yellow flag
xxx |xxx
```

The determined phoneme list is as below:
Yellow: Y EH L OW
Yellow: Y EH L AX
Flag: F L AE GD The created phoneme tree is as shown in FIG. 5D.

Figure 5D:
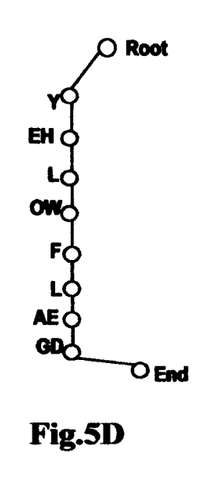

Since in this simple example, the phoneme tree shown in FIG. 5D is already optimized, it needn't be optimized by an optimizer component.

Figure 5E:
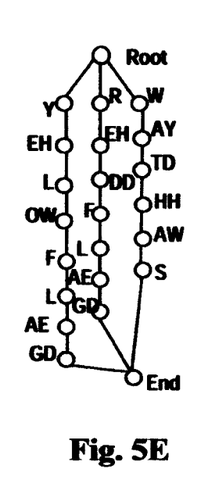

Further, since this is a third obtained phoneme graph and the first and second phoneme graphs are obtained previously, combination occurs at this time. The combination result is as shown in FIG. 5E.

Figure 5F:
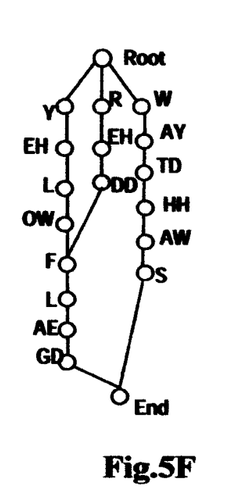

In addition, at this time the combination result of the first phoneme graph, the second phoneme graph, and the third phoneme graph is not optimal because two branches have identical nodes F, L, AE, and GD. Therefore, the combination result is optimized at this time. The optimized combination result is as shown in FIG. 5F.

Additionally, before the third obtained phoneme graph is combined, if the data source changes—for example, if the data source is a web page and a user clicks a link on the web page—then combination of the third obtained phoneme graph is continued and the combination result is cached so that when the user returns back to the above web page, the combined phoneme graph can continue to be used.

According to the present invention, the phoneme graph of the partial word list needs to be determined each time, and therefore the computational complexity can be reduced. Further, before combination of the obtained phoneme graphs is finished, once a combination result already has sufficient information for speech recognition, the speech recognition will begin, thereby improving the performance of the speech recognition.

It should be noted that some more specific technological details which are publicly known for those skilled in the art and are requisite for realization of the present invention are omitted in the above description to make the present invention more easily understood.

The description of the present invention is provided for illustration and depiction purpose, not for listing all the embodiments or limiting the present invention to the disclosed form. It is understood by those skilled in the art that many modifications and variations are obvious based on the teachings provided herein.

Therefore, the above preferred embodiments are selected and described to better illustrate principles of the present invention and actual applications thereof, and to enable those having ordinary skill in the art to understand that without departure from the essence of the present invention, all the modifications and variations fall within the scope of protection of the present invention as defined by the appended claims.

The invention claimed is:

1. A computer implemented method of converting a text form into a phoneme tree, comprising:
    parsing a data source in the text form to obtain a plurality of partial word lists of the data source, the data source comprising content of a web page;
    compiling the plurality of partial word lists to create a plurality of phoneme graphs, each phoneme graph corresponding to a respective partial word list, each phoneme graph including a root node, a plurality of phonemes, and an end node;
    combining the plurality of phoneme graphs to form the phoneme tree, wherein the phoneme tree includes at least a first phoneme graph and a second phoneme graph sharing a common root node and a common end node.

2. The method according to claim 1, further comprising:
    judging whether the phoneme tree has sufficient information to conduct speech recognition; and
    responsive to judging that there is sufficient information, conducting the speech recognition using the phoneme tree.

3. The method according to claim 1, wherein under a circumstance that the data source changes responsive to a user clicking on a link of a rendering of the web page, continuing the combination of the created phoneme graphs into the phoneme tree and caching the phoneme tree for use by the speech recognizer while a data parser parses the changed data source to obtain updated partial word lists, one or more compilers compile the updated partial word lists to create updated phoneme graphs corresponding, respectively, to the updated partial word lists, and a combiner combines the created updated phoneme graphs into an updated phoneme tree that is then used by the speech recognizer to conduct the speech recognition of the text form in the changed data source.

4. The method according to claim 1, wherein parsing a data source in the text form to obtain the plurality of partial word lists of the data source comprises:

segmenting the data source to obtain segments of the data source, and parsing the data source segments, in parallel, to obtain the plurality of partial word lists of the data source segments for use in the compiling.

5. The method according to claim 1, wherein parsing a data source in the text form to obtain the plurality of partial word lists of the data source comprises:

parsing the data source, in series, to obtain the plurality of partial word lists of the data source for use in the compiling.

6. The method according to claim 1, further comprising:

optimizing the phoneme tree responsive to determining that at least two branches of the phoneme tree contain identical nodes.

7. The method according to claim 1, wherein compiling the plurality of partial word lists to create the plurality of phoneme graphs corresponding, respectively, to the plurality of partial word lists comprises:

applying a grammar template with respect to a selected one of the partial word lists to create a grammar corresponding to the selected partial word list, the created grammar specifying a sequence of words determined to be present in the selected partial word list;

determining a phoneme list of the grammar, the phoneme list specifying, for each of at least one pronunciation of each word in the specified sequence of words, a list of phonemes corresponding to the each pronunciation;

creating the phoneme graph corresponding to the determined phoneme list; and optimizing the phoneme graph.

8. The method according to claim 1, further comprising:

when combining the plurality of phoneme graphs to form the phoneme tree, optimizing the phoneme tree by eliminating from the second phoneme graph a list of phonemes appearing in the first phoneme graph; and creating, at either the first or last phoneme in the list, a common intermediate node between the first phoneme graph and the second phoneme graph in the phoneme tree.

* * * * *